United States Patent Office 3,733,372
Patented May 15, 1973

3,733,372
IRIDESCENT MATERIAL AND METHOD MAKING THE SAME
Akira Kose, Koganei, and Yoko Kobayashi, Fujisawa, Japan, assignors to Zaidan-Hojin Oyo Kogaku Kenkyujo, Tokyo, Japan
No Drawing. Filed Feb. 5, 1971, Ser. No. 113,054
Int. Cl. C08f 19/02, 19/20
U.S. Cl. 260—886
11 Claims

ABSTRACT OF THE DISCLOSURE

A stabilized light reflecting iridescent polymeric material is provided. The new material comprises a three dimensional, closely packed regularly arranged structure of uniform polymeric microspheres. The microspheres are obtained from a non-film-forming polymeric latex and have a particle diameter in the range from 1,500 to 4,500 A. The polymeric structure is semi-stabilized by sintering the particles by heat treatment in a liquid having no measurable solubilizing effect on the microspheres. The semi-stabilized polymeric structure is then completely stabilized by surrounding the microspheres with a polymeric material having no measurable solubilizing effect on the microspheres and having a refractive index differing from that of the microspheres in absolute value to the extent of up to 0.1 to provide optical discontinuity.

BACKGROUND OF THE INVENTION

According to an article by J. W. Vanderhoff et al., Journal of the Optical Society of America, vol. 44, pp. 603–609 (1954) when monodispersed polyvinyltoluene latices, having a diameter range from about 100 to 1,000 m$\mu$, are dried to form a frail film, the particles of the latex spontaneously arrange themselves in a close-packed crystalline array.

The resulting film is characterized by an iridescent surface color. The crystalline samples show beautiful iridescent effects under the illumination of white light. Unfortunately, iridescent films produced in this manner are too fragile for practical use. If the films are heat treated their mechanical strength is considerably improved, but there is a marked decrease in diffracting power. Heat treated samples are more transparent than untreated samples. As the samples become clearer the diffracting power is weaker and after prolonged heat treatment the final film is a transparent and non-diffracting material.

Thus, heretofore, there has been no practical way of providing a stabilized three dimensional close-packed iridescent structure. The known iridescent films are too fragile for practical use in decoration or ornamentation and if such films are heat stabilized they lose their pronounced iridescent characteristics. We have succeeded in providing a stabilized iridescent structure which has practical utility for decoration and ornamentation.

SUMMARY OF THE INVENTION

According to the present invention a three dimensional closely packed regularly arranged structure of uniform polymeric microspheres is provided. The microspheres originate from a non-film-forming latex and are characterized by a particle diameter in the range of 1,500 to 4,500 A. The structure is semi-stabilized by heat sintering the polymeric particles in a liquid which has no measurable solubilizing effect on the microspheres. The structure is then stabilized by surrounding the microspheres with a polymeric material which has no measurable solubilizing effect on the microspheres and which has a refractive index differing from that of the microspheres in absolute value to the extent of up to one tenth to provide optical discontinuity.

The new stabilized light reflecting iridescent polymeric material is made by maintaining a non-film-forming polymeric latex in a quiescent state until iridescence is observed. At this point the particles of the latex become closely packed and regularly arranged. The latex consists of substantially uniform particles having an average particle diameter in the range of 1,500 to 4,500 A. and a water content of up to 20 to 50% by weight.

Water is removed from the compacted latex while maintaining it in a quiescent state. Water removal is continued until the water content is reduced to less than 5% by weight. To the dehydrated latex is added an inert liquid whereby the voids of the structure are impregnated with such liquid by vacuum or pressure impregnation. The dried material is heat treated by surrounding it with excess inert liquid and heating at a temperature ranging from 60° C. to just below the softening point or decomposition temperature of the material to impose mechanical stability upon the material by sintering or fusing of the particles of the structure to the extent that the particles maintain their independence from each other.

The particles of the compacted latex are then surrounded with a polymerizable material which has no measurable solubilizing effect on the microspheres and which has a refractive index differing from that of the particles in absolute value up to the extent of one tenth to provide optical discontinuity in the final product.

The material surrounding the particles is polymerized to form a light reflecting polymeric material exhibiting intense color caused by optical interference phenomena.

DETAILED DESCRIPTION

The iridescent material of the invention is made by a process involving following six steps:

(1) Quiet standing, which results in the formation of a three dimensional close-packed structure of regular array;

(2) Drying, whereby a semi-stabilization of the iridescent structure is obtained;

(3) Impregnation with an inert liquid, whereby voids of the structure are filled with liquid for subsequent heat treatment;

(4) Heat treatment, whereby mechanical stabilization of the iridescent structure is obtained;

(5) Substitution, whereby the inert liquid used for the heat treatment is replaced either directly by a polymerizable material having appropriate properties of refractive index and compatibility or indirectly by a non-volatile liquid and then by a polymerizable material; and (6) Polymerization, whereby the monomer surrounding the three dimensional close-packed structure is polymerized by conventional means to stabilize the iridescent structure.

SYNTHETIC LATEX SELECTION

Synthetic latices, which are suspensions of ultramicrospheres of synthetic high polymers, have been widely used for treating textiles, paper, cement, adhesives and so forth. Specially prepared polystyrene latices having a highly uniform particle size are conventionally used as a standard for magnification calibration of the electron microscope. Many kinds of high polymer synthetic latices are commercially available, typically among these being polystyrene, styrene-butadiene copolymers, methyl methacrylate-acrylate ester copolymers, acrylonitrile-butadiene copolymers, vinyl chloride-vinyl acetate copolymers, vinylidene chloride-vinyl chloride copolymers, styrene-divinyl benzene copolymers, and so forth. It is known that the particle size of the microspheres of these latices ranges between about 500 to 10,000 A. in diameter.

The particular synthetic latices used in the present invention are characterized by non-film-forming properties when dried below 60° C., in other words, the minimum film-forming temperature of these latices is above 60° C. When dried below 60° C. the particles of such non-film forming latices form on a substrate a white powdery or chalky mass with no mechanical strength. When a film-forming latex is thus dried the particles of the latex coalesce and form on the substrate a transparent or semi-transparent film which can be peeled intact from the substrate.

Typical polymers and copolymers which form non-film forming latices include polystyrene, styrene-divinyl benzene copolymers, styrene-methyl methacrylate copolymers, styrene-acrylic acid copolymers, polyvinyl toluene, vinyl toluene-divinyl benzene copolymers, polymethyl methacrylate, methyl methacrylate-divinyl benzene copolymers, polyvinyl chloride, polyacrylonitrile, and so forth.

From the point of view of preparing a perfectly regular close-packed array of particles in a three dimensional structure, the size distribution should be as narrow as possible; ideally the deviation in particle size should be zero. Because it is impossible to prepare a latex of perfect uniformity some variation in particle size must be tolerated, a reasonable one being if 80% of the mass of particles has a particle size within ±10% of the average particle size of the mass. We found that good iridescent effects cannot be achieved if the size distribution is less uniform than such variation; the resulting structure becomes irregular and the iridescent effects produced are markedly decreased. However, a highly regular arrangement of latex particles can also be obtained from a latex having less uniformity in particle size by controlling the conditions under which the closely packed three dimensional structure is obtained. In this case the important factors are the stability of the latex, the concentration of the latex particles, the rate at which water is removed from the latex and the temperature. By controlling these conditions a uniformity in three dimensional structure occurs because the larger particles tend to segeregate from the smaller ones at the time of formation of the three dimensional structure. This segregation effect is characterized by an upper layer within the three dimensional structure consisting of smaller particles and a lower layer consisting of larger particles. The formation of the three dimensional structure takes much more time compared with the time requirded to form such structure from a latex having a highly uniform particle size. Because of time requirements it is the best to use a latex having the highest possible degree of particle size uniformity. If the particle size distribution deviates considerably from the 80% uniformity it is not possible to form a regular three dimensional structure and accordingly no iridescent effect is produced.

The latices used in the present invention are made by conventional emulsion polymerization. If the resulting latex suspension prepared by conventional means does not satisfy the required conditions of particle size and uniformity, conventional methods such as hydraulic elutriation or centrifugal separation can be used in order to provide a latex having the necessary physical characteristics.

QUIESCENT PARTICLE ARRANGEMENT

According to the above mentioned article in the Journal of the Optical Society of America, when a latex suspension is placed in a glass container and allowed to stand quietly for several hours or is coated on a glass plate and dried down slowly, the latex particles spontaneously arrange themselves in a regular close-packed array. Suspensions or dried films reveal beautiful iridescent colors at the container-suspension and air-suspension interfaces or on the surface of the film. We have found that the formation of such a structure is greatly affected by the colloidal stability and the particle concentration of the latex suspension. The formation of the three dimensional structure having a regular array from the particles suspension is due to the colloidal interaction between the particles. Such interaction is dependent on the colloidal stability of the suspension and on the particle concentration. Generally speaking, more uniform closely packed three dimensional structures can be formed from a latex suspension having a higher degree of colloidal stability and high particle concentration.

According to the invention the colloidal stability of the suspension can be easily determined either by direct measurement of the ionic concentration or by the quantity of the polyvalent ionic standard solution that can be added to the suspension without coagulation. Ionic concentration can be measured directly by means of electrical conductivity. From the standpoint of forming a highly regular iridescent structure, the lower the ionic concentration the better the result. Preferably the ionic concentration should be less than $3 \times 10^{-3}$ mol/l. or preferably $3 \times 10^{-4}$ mol/l. when expressed as KCl. From the standpoint of producing an iridescent color effect, the stability of the latex suspension must be correlated with the particle concentration when the particle concentration is low; that is, for example, if the particle concentration is between 10 and 20% by weight, the ionic cencentration must be correspondingly low in order to produce iridescence.

The problem of ionic concentration can be offset to some extent by adding a high polymer protective colloid and or surfactant in order to maintain the colloidal stability of the suspension. Suspension stability can be determined by a standard stabilization test involving the addition of a standard 0.5% by weight aqueous solution of $CaCl_2$. Suspensions to which can be added at least 5 cc. of $CaCl_2$ standard solution per 100 ml. of suspension without coagulation are useful in the present invention. The degree of coagulation is determined by observing the sample under an ultramicroscope. Provided that the proper relationship exists between the ionic concentration and the concentration of the particles in the latex suspension, the concentration of particles is not particularly critical; however, at very low concentration care must be taken during subsequent drying to maintain the proper relationship between ionic concentration and particle concentration. Preferably according to the invention the starting particle concentration should be in the range of 20 to 50% by weight in order to achieve the regular array of three dimensional closely packed particles upon subsequent drying.

In order to control the conditions of colloidal stability and particle concentration for the formation of a highly regular array of three dimensional closely packed particles, the conventional methods can be used; namely, dialysis, deionization using ion exchange resins, further addition of stabilizer, concentration by evaporation of water, centrifugal separation and the like.

DRYING OF THE SUSPENSION

A suspension having the required conditions of particle concentration and colloidal stability is placed in a suitable container and allowed to stand quietly. The suspension is dried by slow evaporation of the water. As drying proceeds and an iridescent region begins to appear and flecks showing pronounced iridescent color become observable at the interface of the container and the suspension and at the air-suspension interface. The appearance of this phenomenon indicates that the particles in the suspension have become arranged in a regular three dimensional close-packed structure. The resulting arrangement can be classified as a face centered cubic closed-packed structure. The iridescent region at the interface is considered to be (111) face of the structure orienting parallel to the interface. The color changes of the iridescent structure are dependent upon the size of the spherical particles making up the structure, the angle of the incident beam of light, and the average refractive indices of the constituent materials of the structure. The underlying principle of this iridescent phenomena can be attributed to Bragg's reflection caused by regular arrangement.

The correlation between observed color and particle size, incident beam angle and refractive index of the constituent materials is as follows:

$$2na \sin \theta = m\lambda \quad (1)$$

$$a = \sqrt{\frac{2}{3}} \cdot d \quad (2)$$

$$n = xn_1 + yn_2 \quad (3)$$

In the above formulas $n$ denotes the average refractive index of the constituent materials; $n_1$ denotes the refractive index of a particle; $n_2$, the refractive index of the void filling material; $a$, the lattice distance (in this case "$a$" denotes lattice distance of the (111) plane of a face centered cubic structure); $\theta$, the angle of the incident beam; $m$, the order of interference (a positive integer, 1, 2, 3 . . . ); $\lambda$, the wavelength; $d$, the particle diameter in angstrom units; $x$, the ratio of the specific volume of spherical particles in the structure; and $y$, the ratio of the specific volume of void filling material in the structure, respectively.

Evaporation or drying in the quiescent state is terminated at the point at which the water content of the suspension is decreased to below 5% by weight. As the water evaporates from the suspension the suspension becomes thicker and thicker. At the point at which the water content of the suspension is decreased to below or about 20%, the suspension changes to a white chalky mass with little or no mechanical strength. The dried material reveals a dull iridescent effect on its surface composed of dominant iridescent color (the color observed vertically when the material is illuminated vertically) and scattered white light.

As the drying of the material proceeds further the structure becomes semi-stabilized by a slight sintering or fusion of the particles due to the force generated from the surface tension of water. The sintered material, although it has insufficient mechanical strength and stability for practical use, is sufficiently stable to be processed further according to the steps of this invention.

The phenomena occurring in the suspension during drying are believed to be as follows: while the water content of the suspension is in the range of from about 50 to 80%, particles are suspended in the surrounding medium without contacting each other through the force of colloidal interaction and thus they arrange themselves into a structure having a regular array. On further decrease of the water content the particles become more concentrated and at about 20% water content the particles come into contact. On further drying particles partially sinter to each other thus forcing out dispersants such as surfactants or protective colloids by means of the force generated by the surface tension of surrounding medium. Thus the structure achieves a semi-stabilized state. At this stage the dispersant and water within the voids of the structure are considered to form an independent network throughout the structure.

At the final stage where the water content of the material is reduced to below 5%, the degree of sintering of the particles becomes somewhat greater as compared with that at the beginning of drying, and the dehydrated material has an iridescent color having superimposed scattered white light on its surface. The dehydrated material is too friable to withstand to mechanical stress or ambient changes occurring during practical use.

According to the article in the Journal of the Optical Society of America (1954) the diffracting material prepared by drying the suspension was very friable, and an attempt was made to give it mechanical strength by heat treatment in the dried state. As a result of this attempt the diffracting power of the material was decreased markedly and transparency was increased. Thus it was believed that the mechanical strength was increased due to increase of sintered area of the neighboring particles by heat treatment, but the light diffracting power was decreased markedly or became utterly lost because of either the loss of the optical discontinuity of the structure or the disturbance of regular arrangement of the structure.

IMPREGNATION OF LIQUID VOID FILLING SUBSTANCE

The dried material having a water content below 5% is immersed either in an organic liquid having no measurable solubilizing effect on the compacted particles or once again in water to fill up the voids in the structure with liquid by means of vacuum impregnation and or pressure impregnation. Suitable inert liquids include water; liquid paraffins; chlorinated paraffins; aliphatic alcohols, such as butanol, pentanol, hexanol, octanol, and their isomers, and stearyl alcohol; and polyols, such as ethylene glycol, polyethylene glycol, propylene glycol, glycerine and so forth.

As a practical matter, the choice of the liquid can vary widely, but the liquid should not have any appreciable solubilizing effect on the compacted particles and should have an appropriate boiling point depending upon the conditions of heat treatment.

If the liquid has solubilizing effects on the compacted particles to some extent, the particles will redisperse into the liquid again. For example, if dried, frail iridescent flakes consisting of styrene-divinyl benzene (95/5 by weight percent) copolymer particles are dipped in benzene for liquid impregnation, the particles begin to disperse from the surface of the compacted material and the liquid becomes turbid; accordingly, iridescent color disappears. Moreover, if the liquid has a strong solubilizing effect on the particles, as in the case of polystyrene particles and benzene, upon impregnation of with liquid, the particles dissolve in the liquid and form a transparent homogeneous solution of benzene and styrene polymer, which, of course, has no iridescent effect.

The liquid impregnation is carried out by soaking the dried material in an appropriate liquid. As is apparent from the foregoing description the dried iridescent material consists of polymeric particles and the voids, which are connected to each other by narrow channels of a submicron order. If water is used as an impregnation liquid the addition of a suitable surfactant is desirable because the polymeric particles often lose their hydrophilic surface properties when dried. If the water does not contain a surfactant it is almost impossible to force it into the voids through such narrow channels, because the air present in the voids and channels will prevent the water from filling the voids. As the material is dipped into an appropriate liquid, the liquid permeates through the channels into the voids due to capillary action; however, in order to insure complete impregnation within a reasonable period of time, impregnation is carried out with the aid of pressure or vacuum, that is, pressure impregnation is carried out under atmospheric pressure up to 3 atmospheres, preferably up to 5 atmospheres and vacuum impregnation is carried out under atmospheric pressure down to $10^{-2}$ mm. Hg, preferably down to $10^{-3}$ mm. Hg.

After the impregnation of the dried material with the liquid with the passage of time the material gradually becomes transparent from its edges and the dominant iridescent colors shift to a longer wave length, depending upon the refractive index of the liquid used. These changes in transparency and in iridescent color indicate that the voids of the structure have been impregnated with the liquid without destroying the regular arrangement of the structure.

HEAT TREATMENT

The liquid impregnated sample is then heat treated by surrounding it with excess liquid in a suitable container, such as glass container or a pressure bottle, at a temperature in the range between the minimum film forming temperature of the particular polymer (at least 60°) and the melting point or decomposition temperature for a period of time varying from several minutes to several hours. For example, a liquid paraffin impregnated iridescent sample made of styrene-divinyl benzene copolymer spheres is treated at 115° to 125° C. for 1.5–3 hours in an oil bath. Times and temperatures for other polymers vary depending on the nature of the polymer and on the impregnating liquid.

The material thus treated has both iridescent color and sufficient mechanical strength to be incorporated in synthetic resins. Therefore, according to the invention, heat treatment is conducted successfully without destroying the regular arrangement of the structure.

In general, the higher the heat treatment temperature, the shorter the treating period and vice versa. When the sample is heat treated at a temperature below the proper temperature range, the sample retains its iridescent structure; however, there is no improvement in mechanical strength. On the other hand, if the temperature is much above than the proper temperature range, the mechanical strength of the sample increases considerably, but the treated sample does not reveal any iridescent color and becomes transparent or is colored by the partial decomposition of the sample.

Comparing the heat treatmeat of this invention with that described in the J.O.S.A., the decrease in iridescent effects accompanying the improvement of mechanical strength reported in the article does not occur in the treatment according to this invention.

In order to find out the effect of the surrounding medium used for heat treatment, two experiments were carried out under the same temperature and time conditions. In one case the surrounding medium was omitted. Thus, when two iridescent samples consisting of styrene-divinyl benzene copolymer spheres were heated at 115° C. for 3 hours, the mechanical strength of both samples increased considerably. The liquid impregnated sintered sample showed iridescent color, but the dry sintered sample showed no iridescent color and was transparent.

From this fact, it is clear that the immersion liquid used according to the present invention plays an important role in retarding the sintering rate of adjacent particles caused by heat-treatment, and serves to maintain optical discontinuity throughout the structure and to promote uniform heating. Because of the sintering retardation effect of the immersion liquid, it becomes possible to choose the heat treatment temperature range and time as desired; therefore, it is possible to control the degree of sintering to the extent of both providing mechanical stability and retaining iridescent effect.

REPLACEMENT OF IMMERSION LIQUID USED FOR IMPREGNATION

The immersion liquid within the regular polymeric structure is replaced according to the invention either directly with a polymerizable material used to surround the particles or indirectly by first replacing the organic liquid with an inert non-volatile organic liquid, coating the particles with an oil resistant film, and subsequently surrounding the compacted coated particles with a polymerizable material.

The material selected to replace the immersion liquid must not have any solubilizing effect on the compacted microspheric particles comprising the iridescent structure. Any measurable solubilizing effect will result in the destruction of the iridescent structure. With respect to replacing material, it must have a refractive index differing from that of the polymeric structure in absolute value of to the extent of 0.1 to provide optical discontinuity in the final product.

In the case where the immersion liquid is directly replaced with polymerizable monomer the conditions with respect to refractive index must be fulfilled upon completion of the polymerization. The difference in refractive index between the compacted structure and the surrounding polymerized material is expressed according to following relationship:

$$0.1 \geq |n_1 - n_2| > 0 \tag{4}$$

wherein $n_1$ denotes the refractive index of three dimensional close-packed regularly arrayed structure and $n_2$ denotes the average refractive index of the polymeric material used to fill the voids.

From the standpoint of selecting a suitable monomer the monomer should have no measurable solubilizing effect on the iridescent structure. Also, the shift of the refractive index caused by polymerization must be considered. The refractive index difference between the iridescent structure constituent material and the void filling material is one of the most important factors affecting the dominant reflecting color and the transparency of the final iridescent composition. We have found that both iridescent effects and transparency of the composition are superior when the refractive index difference between the microspheres and surrounding void filling material is equal to or less than 0.1 in absolute value and of course greater than 0. If the refractive index difference is greater than 0.1 in absolute value, iridescent sparkle will be found on the surface of the composition, however, the opacity of the composition is considerably increased so that illuminated light does not penetrate deeply in the composition and accordingly, the iridescent effect is drastically decreased. On the other hand if the refractive index difference is equal to zero the material simply becomes transparent and, because of the lack of optical discontinuity, there is no iridescent effect.

In general, as far as practical use is concerned, the requirements for transparency, dominant iridescent color and type of iridescent effects are somewhat subjective. The combination of these properties depends upon the intended use and upon the preference of the user. The difference in refractive index is extremely important with respect to controlling these requirements. The required refractive index variation can be produced either by the proper choice of a single material to replace the immersion liquid or, if this is not satisfactory, by choosing a mixture of materials wherein the mixed materials have a refractive index differing from each other.

Suitable monomers to be used to replace the immersion liquid include styrene, methylstyrene, dimethylstyrene, ethylstyrene, diethylstyrene, divinylbenzene, monochlorostyrene, monochloromethylstyrene, monochlorodimethylstyrene, dichlorostyrene, dichloromonomethylstyrene, monobromostyrene, dibromostyrene, dimethyl maleate, diethyl maleate, methyl acrylate, ethyl acrylate, n-propyl acrylate, n-butyl acrylate, n-amyl acrylate, allyl acrylate, methyl methacrylate, ethyl methacrylate, allyl methacrylate, n-propyl acrylate, isopropyl methacrylate, n-butyl methacrylate, n-amyl methacrylate, vinyl acetate, allyl acetate, diallyl phthalate, diallyl adipate, diallyl sebacate, diallyl maleate, unsaturated polyesters combined with styrene or methyl methacrylate monomer, and so forth.

If the immersion liquid is to be replaced by a non-volatile liquid prior to final stabilization using a polymerizable monomer, the following liquids are recommended; i.e. dialkylphthalates in which the alkyl group has up to 8 carbon atoms, such as dimethyl phthalate, diethyl phthalate, dibutyl phthalate and dioctyl phthalate; tributyl phosphate, tricresyl phosphate, dibutyl adipate, dibutyl sebacate, saturated polyesters, and so forth.

During immersion the heat treated structure sometimes swells depending upon the particular choice of polymerizable monomer or non-volatile liquid and the material itself. However swelling can be tolerated provided that the monomer or non-volatile liquid does not destroy the regular array of the particles.

When the heat treated compacted iridescent structure is immersed either in polymerizable monomer or non-volatile organic liquid the structure becomes more transparent and the iridescent color shifts to that of a longer wavelength because of change in refractive index relationship and also because of the change in volume of the constituent spheres caused by swelling.

After any swelling that occurs has ceased, the monomers surrounding the compacted iridescent structure are polymerized by conventional means using free radical catalysts such as benzoyl peroxide, acetyl peroxide, azobisisobutyronitrile and so forth. After polymerization a solid and stable iridescent composition is obtained. On the other hand, if a non-volatile liquid rather than a polymerizable monomer is first used to replace the immersion liquid, the resulting iridescent material, after swelling has ceased, is separated by decantation and then allowing the non-volatile liquid to drain off, and is subsequently treated by dipping in an aqueous solution of a water soluble high polymer having low permeability, in other words no miscibility in the non-volatile liquid. Such water soluble high polymers include gelatin, polyvinyl alcohol, arginic acid, gum arabic, agar-agar, carboxymethyl cellulose, soluble starch, casein and so forth.

Treatment with such a polymer temporarily stabilizes the iridescent composition by forming during drying an oil resistant film on its surface. The thus treated iridescent material is incorporated within polymerizable monomers, such as methyl methacrylate monomer, styrene monomer, unsaturated polyester, etc. and thereafter the entire composition is permanently stabilized by polymerization using conventional means.

The iridescent composition produced according to the invention displays beautiful and varied iridescent flecks which change color depending upon the angle of the observation. Furthermore, because of the transparency of the composing incident light can penetrate into the deeper portion of the structure so that the reflections from another plane, such as the (220) plane, can be observed, thus providing unexpectedly beautiful iridescent effects.

Our invention is further illustrated by the following examples.

EXAMPLE 1

A styrene-divinyl benzene copolymer (95/5; parts by weight) suspension containing particles having a degree of uniformity of greater than 80% as heretofore described with an average particle diameter of about 2,000 A. (solids content: 20% by weight, concentration of inorganic electrolyte: les sthan $3 \times 10^{-4}$ mol/l.) was placed on a glass plate and allowed to stand quietly at room temperature. After an iridescent color became observable at the air and suspension interface, water was slowly evaporated from the suspension. Evaporation was discontinued when the water content of the suspension was reduced to below 1% by weight. The resulting material was white and chalky. When it was illuminated by white light, a violet iridescent color on which scattered white light was superimposed could be observed. The dried material was very fragile, requiring great care in handling.

The dried iridescent material was immersed in liquid paraffin with great care and impregnation of the liquid was done by vacuum impregnation at $10^{-3}$ mm. Hg. As the impregnation of the liquid proceeded the material became transparent from its edges and the dominant iridescent color shifted to that of a longer wavelength. After the whole mass of the material became impregnated, the material was placed in a glass container along with the excess liquid and was heat treated at 103° C. for 3 hours in an oil bath. By this treatment there were no changes in transparency of the material but the mechanical strength improved considerably and the material had sufficient mechanical stability to be further processed. The heat treated material was then mixed with a mixture of 80 parts styrene monomer and 20 parts by volume of diallyl phthalate and allowed to stand for several hours to replace liquid paraffin used in heat treatment by the mixture of monomers. After removal of excess mixed monomers, a mixture having the same composition of styrene monomer and diallyl phthalate was added to the material.

To the mixture and the material was added 2% by weight benzoyl peroxide and polymerization was carried out by heating to 75° C. The product thus produced was transparent and had green iridescent effects, which changed throughout the body with a change of the angle of observation.

The product has a beautiful and pronounced iridescent effect when it is cast directly or incorporated into monomer to provide iridescent articles.

EXAMPLE 2

The procedure of Example 1 was repeated and a dried chalky iridescent material was obtained. After impregnation of liquid paraffin into the voids of the structure at $10^{-2}$ mm. Hg evacuation, the material was heat treated at 120° C. for 2 hours. The material thus treated had a mechanical strength comparable to that of the material obtained in Example 1, but the transparency had increased as compared with that of Example 1. After removing liquid paraffin from the material by substitution with an appropriate solvent, the material was immersed in a mixture of styrene monomer and diallyl phthalate (80/20 by volume), and polymerization was carried out at 75° C. using 2% benzoyl peroxide and standard polymerization conditions. The product thus obtained was pleasing in iridescent effect.

EXAMPLE 3

The procedure of Example 1 was repeated and a chalky and fragile material having iridescent effects was obtained. The material was then immersed in a 3% by weight aqueous solution of sodium dodecyl sulfate and heat treated at 110° C. under about 1.4 atm. for 3 hours in an autoclave. The heat treated material thus obtained reflected blue light under the illumination of white light and was opaque.

After dehydration by immersing it in methyl alcohol, the material was incorporated in a mixture of styrene monomer and diallyl phthalate (35/65 by volume) and polymerization was carried out as previously described using benzoyl peroxide, 1% by weight, at a polymerization temperature at 80° C. The product thus obtained was pleasing in both iridescent effects and transparency.

EXAMPLE 4

A polystyrene latex suspension having substantially a uniform particle size of about 2,800 A. (solids content: 25% by weight, concentration of inorganic electrolyte: less than $10^{-4}$ mol/l.) was placed in a glass container and allowed to stand quietly. After iridescence had appeared, water was evaporated slowly from the suspension at 40° C. under controlled atmospheric conditions. Evaporation was discontinued when the water content of the suspension was reduced to below 1% by weight. The resulting material was chalky in appearance and had a dull blue iridescent effect.

The product was immersed in liquid chlorinated paraffin and the voids of the structure were filled with the liquid by vacuum impregnation at $10^{-3}$ mm. Hg. Then the material became transparent and the iridescent color shifted to red. The material was heat treated in excess chlorinated paraffin at 100° C. for 2 hours. The material thus treated was rather transparent and had a red iridescent color and sufficient mechanical strength for practical use. The heat treated material was incorporated in a mixture of styrene monomer and diallylphthalate, fulfilling the required refractive index conditions, and polymerization was carried out as previously described. The product thus obtained produced a pronounced iridescent effect in finished articles when it was cast directly or incorporated in other synthetic resins.

EXAMPLE 5

The procedure of Example 4 was repeated and a heat treated iridescent material was obtained. After the removing solvent used in the previous step by appropriate solvent substitution, the material was immersed in a mixture of 90 parts diphenyl chloride and 10 parts dibutyl adipate (by volume) to fill the voids of the structure. Then, after removing excess liquid mixture from the material, it was dipped in a 2% aqueous solution of polyvinyl alcohol. Excess solution was allowed to drain for a few minutes and the resulting product was dried for several minutes, after which a thin polyvinyl alcohol film formed on its surface. By repeating this procedure several times a thicker and stronger film was obtained. The iridescent material coated with the oil proof film was incorporated into various synthetic resins, including polymethyl methacrylate, polystyrene and unsaturated polyesters and their monomers. Molded and casted articles showed strong and beautiful iridescent effects.

EXAMPLE 6

A styrene-methyl methacrylate copolymer suspension having highly uniform particle diameter of about 2,200 A. was placed in a glass container and allowed to stand quietly. After an iridescent color became observable at the interface of the suspension and container, water was removed slowly from the suspension by evaporation, until the water content was reduced to below about 1% by weight. The dried material was opaque and fragile and had iridescent color on its surface. The dried material was then heat treated according to the procedure described in Example 1. The material thus heat treated had satisfactory mechanical stability, but was weak in iridescent effect. The liquid used in the heat-treating was removed from the material using an appropriate solvent, and the material was then immersed in a mixture of diallyl phthalate and methyl methacrylate (90/10 by volume). Polymerization was carried out as previously described. The product thus obtained was pleasing in both transparency and iridescent effect.

EXAMPLE 7

A polyvinyl toluene suspension having a highly uniform particle size (greater than 80% as previously explained) was used in obtaining dehydrated iridescent material. The material thus obtained was immersed in a 3% by weight aqueous solution of sodium dodecyl sulfate and heat treated at 120° C. for about 2 hours at 2 atm. in a pressure bottle. The material thus treated had iridescent color on its surface and was opaque; however, the mechanical strength had increased considerably. After dehydration of the material using methyl alcohol, it was incorporated in a mixture of styrene monomer and diallyl phthalate and polymerization was carried out as described in the previous examples. The material thus produced was pleasing in both transparency and iridescent effect.

EXAMPLE 8

The procedure of Example 7 was repeated to obtain heat-treated material, and dehydration was also carried out according to the procedure of Example 7. The dehydrated material was immersed in a mixture of styrene monomer and unsaturated polyester and polymerization was carried out as previously described. The transparency of the material thus obtained was somewhat inferior to that produced in Example 7, however, the iridescent effect was extremely pleasing.

EXAMPLE 9

A copolymer (99 parts styrene and 1 part by weight divinyl benzene) suspension having a high degree of uniformity was allowed to dry in a quiescent state and white, opaque, frail material was obtained as described in Example 1. The material was immersed in liquid paraffin and then heat treated under $10^{-3}$ mm. Hg at 103° C. for 3 hours. After removing excess liquid, the material was immersed in a mixture of methyl-methacrylate, styrene and diallyl phthalate. After the passage of time the material became transparent from its edges and swelling of the material occurred with a corresponding color shift to a dominant iridescent color of longer wavelength.

1% benzoyl peroxide was added to the monomer mixture and the material and polymerization at 80° C. was carried out as previously described. The product thus obtained was pleasing in both transparency and iridescent effects.

EXAMPLE 10

A 95/5 by weight methyl methacrylate-divinyl benzene copolymer latex suspension having a uniform particle size was used in obtaining dried material. The dried frail chalky material was heat treated in a 3% aqueous solution of sodium dodecyl sulfate at 110° C. for 2 hours in a pressure bottle at 1.4 atm. After the surfactant solution was removed using a water miscible solvent, the material was immersed in a mixture of methyl methacrylate and diallyl phthalate, and polymerization was carried out as described in the previous examples. The product thus obtained was pleasing in both transparency and iridescent effects.

We claim:
1. A stabilized, light-reflecting iridescent polymeric material comprising:
   a three dimensional, closely-packed regularly-arranged structure of uniform polymeric microspheres;
   (a) said micropheres
      (1) originating from a polymeric latex characterized by non-film forming properties such that the latex particles, when dried below 60° C., form on a substrate a white powdery mass with no mechanical strength, and
      (2) having a particle diameter in the range of 1,500–4,500 A., the uniformity of the individual particles being such that at least 80% of the mass of particles has a particle size within ±10% of the average particle size of the mass, and
   (b) said structure having been initially stabilized by heat treatment to form a partially stabilized compacted particulate structure in which the microspheres are fused to each other but retain their individual identity, and completely stabilized by surrounding said microspheres with a polymeric material, said material
      (1) having no measurable solubilizing effect on said microspheres, and
      (2) having a refractive index differing from that of the microspheres in absolute value to the extent of up to 0.1 to provide optical discontinuity.
2. The light-reflecting iridescent polymeric material according to claim 1 wherein the polymeric latex is a styrene-divinyl benzene latex.
3. The light-reflecting iridescent polymeric material according to claim 1 wherein the polymeric latex is a polystyrene latex.
4. A method of making a stabilized light-reflecting iridescent polymeric material comprising:
   (a) maintaining a colloidally stable polymeric latex, characterized by non-film forming properties such that the latex particles, when dried below 60° C., form on a substrate a white powdery mass with no mechanical strength, in a quiescent state until iridescence is observed, whereby the particles of the latex become compacted and regularly arranged, said latex

(1) consisting of substantially uniform particles having an average particle diameter in the range of 1,500–4,500 A., the uniformity of the individual particles being such that at least 80% of the mass of particles has a particle size within ±10% of the average particle size of the mass, and (2) having water content of 50 to 80% by weight;

(b) removing water from said compacted latex while maintaining the state of quiescence until the water content is reduced to less than 5% by weight to form a compacted regularly-arranged structure of microspheres which are fused to each other while retaining their individual identity;

(c) filling the voids between said microspheres by impregnation with an inert liquid which has no measureable solubilizing effect on said microspheres;

(d) heating the impregnated, fused microspheres to a temperature below the melting point of said microspheres to impart mechanical stability thereto without destroying the regular arrangement of the compacted structure;

(e) surrounding the particles of the compacted structure with a polymerizable material, said material (1) having no measurable solubilizing effect on said microspheres, and (2) forming on polymerization a polymer having a refractive index differing from that of said particles in absolute value to the extent of up to 0.1 to provide optical discontinuity in the final product; and (f) polymerizing the material surrounding the particles to form a stabilized light-reflecting polymeric material exhibiting intense color caused by optical interference phenomena.

5. A method according to claim 4 wherein the inert liquid used for heat treating the impregnated fused microspheres is replaced directly with the polymerizable material used to surround the particles.

6. A method according to claim 4 wherein the inert liquid used for heat treating the fused microspheres is replaced by an inert non-volatile organic liquid and the fused micropheres are (a) separated from said inert liquid;

(b) coated with a water soluble high polymer having low permeability;

(c) dried;

(d) immersed in the polymerizable material; and (e) stabilized by polymerization of the polymerizable material.

7. A method according to claim 4 wherein the colloidal stability of the latex in the quiescent state is such that the addition of 5 cc. of a 0.5% aqueous solution of $CaCl_2$ to 100 ml. of said latex does not cause coagulation.

8. A method according to claim 4 wherein the non-film forming polymeric latex is a styrene-divinylbenzene copolymer latex.

9. A method according to claim 8 wherein the copolymer contains up to 10% by weight divinylbenzene.

10. A method according to claim 9 wherein the polymerizable material used to replace the inert liquid used for heat treating the fused microspheres causes swelling of the fused microspheres without destroying their regular arrangement and said polymerizable material is polymerized after the swelling ceases.

11. The light-reflecting iridescent polymeric material according to claim 1 wherein the polymeric latex is a divinyl benzene copolymer latex.

References Cited
UNITED STATES PATENTS

| | | | |
|---|---|---|---|
| 3,349,046 | 10/1967 | Abell et al. | 260—2.5 |
| 3,475,516 | 10/1969 | Bauer et al. | 260—876 |
| 3,412,177 | 11/1968 | Griffin | 260—881 |

JOSEPH L. SCHOFER, Primary Examiner

W. F. HAMROCK, Assistant Examiner

U.S. Cl. X.R.
260—879, 880, 884, 885

UNITED STATES PATENT OFFICE
CERTIFICATE OF CORRECTION

Patent No. 3,733,372        Dated May 15, 1973

Inventor(s) Akira Kose et al

It is certified that error appears in the above-identified patent and that said Letters Patent are hereby corrected as shown below:

Column 2, line 8, change "20 to 50%"
to read --50 to 80%--

Column 9, line 26, change "arginic acid"
to read --alginic acid--

Column 9, line 53, change "les sthan"
to read --less than--

Signed and sealed this 8th day of October 1974.

(SEAL)
Attest:

McCOY M. GIBSON JR.
Attesting Officer

C. MARSHALL DANN
Commissioner of Patents